United States Patent [19]

Rasilainen et al.

[11] Patent Number: 4,462,744
[45] Date of Patent: Jul. 31, 1984

[54] UNLOADER FOR A SILO OR SIMILAR

[75] Inventors: Juhani Rasilainen; Esko Saarela, both of Lönnström Oy, Finland

[73] Assignee: Lönnström Oy, Rauma, Finland

[21] Appl. No.: 324,407

[22] Filed: Nov. 24, 1981

[30] Foreign Application Priority Data

Nov. 28, 1980 [FI] Finland ................. 803705

[51] Int. Cl.$^3$ ............................. B65G 65/46
[52] U.S. Cl. ................... 414/311; 222/200; 254/104
[58] Field of Search .............. 414/306, 309, 310, 311, 414/312; 222/199, 200, 411; 254/104

[56] References Cited

U.S. PATENT DOCUMENTS

| | | | |
|---|---|---|---|
| 2,890,804 | 6/1959 | Smith | 414/306 |
| 3,071,887 | 1/1963 | Von Arb | 254/104 |
| 3,127,032 | 3/1964 | Roberts | 414/310 |
| 3,817,407 | 6/1974 | Cantenot | 414/306 X |

FOREIGN PATENT DOCUMENTS 1415721 11/1975 United Kingdom ............... 222/199

OTHER PUBLICATIONS

Wennberg "Reclaiming Systems for Rectangular and Circular Silos".
"Chip Handling from the Ground Up".
"Bochure in Russian" Lönnström Oy.

Primary Examiner—Leslie J. Paperner
Assistant Examiner—Ken Muncy
Attorney, Agent, or Firm—Murray Schaffer

[57] ABSTRACT

An unloader for discharging material stored in a silo or similar through an outlet opening in the bottom of the silo has a frame which pivots around a vertical axis and on which is supported a horizontal transport screw rotating around its longitudinal axis. The pivot frame is provided with an upper protecting hood which, in order to prevent arching of material located on top of it, is mounted on the pivot frame so that it does not rotate, as the pivot frame rotates, but continuously is inclined back and forth.

5 Claims, 4 Drawing Figures

UNLOADER FOR A SILO OR SIMILAR

BACKGROUND OF THE INVENTION

The present invention relates to an unloader for a silo or the like used for transferring material stored therein towards an outlet opening in the bottom thereof. The unloader comprises a pivot frame resting on the bottom of the silo and rotatable around a vertical axis, an upper protecting hood, a horizontal transport screw supported on the frame and rotating around its longitudinal axis, and driving mechanisms for pivoting said frame and for rotating said transport screw.

By means of such an unloader, chips, sawdust, bark, milled peat, or any other similar material are discharged from a silo which material, because of arching, requires an unloader covering a wide area. The transport screw rotates around its longitudinal axis and, at the same time, pivots 360 degrees back and forth. The screw transfers material in the silo from the outer periphery of the silo to its centre where the material falls down through a central opening in the bottom of the silo. The unloader can also be positioned in a storage field under a stack-like storage pile. The bottom of the silo can also have the shape of a circular sector, in which case the transport screw pivots only over the central angle of this sector.

In known unloaders of this type, the upper protecting hood of the pivot frame is, in general, fixedly connected to the pivot frame and, accordingly, rotates along with it. This results in the disadvantage that the friction between the protecting hood and the material above it causes a rather great moment resisting the rotary movement of the pivot frame. A stationary protecting hood again suffers from the disadvantage that the material to be discharged tends to form an arch in spite of the pivoting movement of the transport screw.

The object of the present invention is to provide a new unloader which eliminates both above-mentioned disadvantages.

SUMMARY OF THE INVENTION

The unloader according to the invention is mainly characterized in that the protecting hood is journalled in the upper section of said pivot frame in such a way that the journal axis is inclined relative to the pivot shaft of the pivot frame.

Because of this the protecting hood does not rotate along with the pivot frame but instead continuously tilts back and forth while following the movement of the frame, said tilting movement preventing arching of the material.

The bearing between the protecting hood and the pivot frame can, for example, be fastened to an annular beam or similar support inclinable relative to the pivot frame, whereby preferably at least one wedge-shaped spacer is mounted between the annular beam and the pivot frame. In this way the angle of inclination of the protecting hood can be adjusted as required.

Alternatively, the inclination of the protecting hood can be produced by means of a hydraulic or pneumatic cylinder arranged e.g. at the same place as the spacer or by connecting the pivot bearing of the protecting hood to the pivot frame through a vibrator.

In the following the invention will be described with reference to the accompanying drawing.

DESCRIPTION OF THE INVENTION

Figure 1:
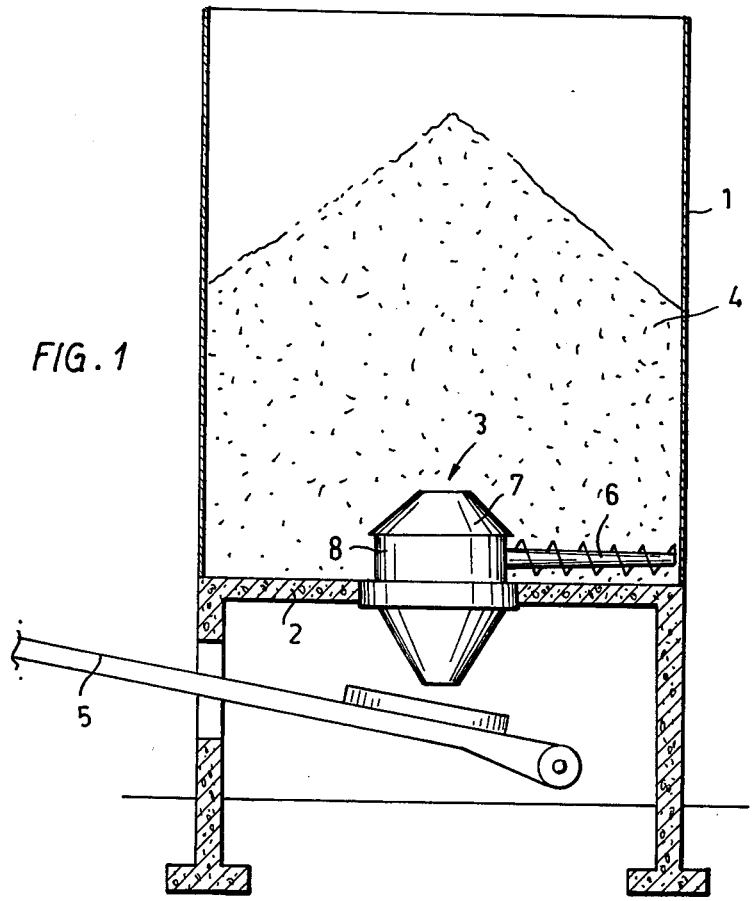
FIG. 1 is an axial vertical section of a silo provided with an unloader according to the invention.
Figure 2:
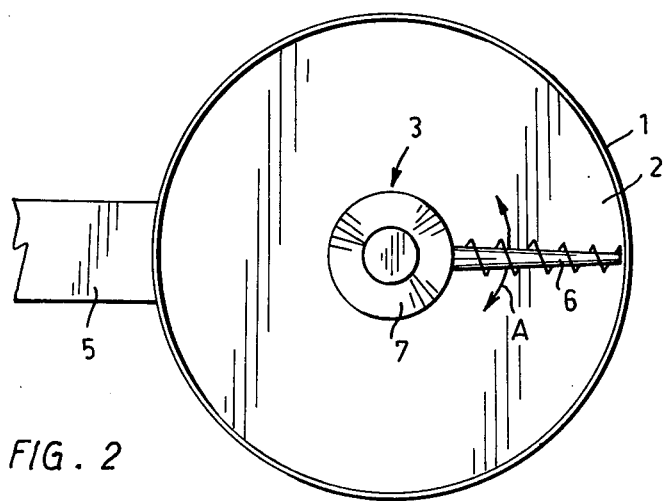
FIG. 2 is top plane view of silo of FIG. 1.
Figure 3:
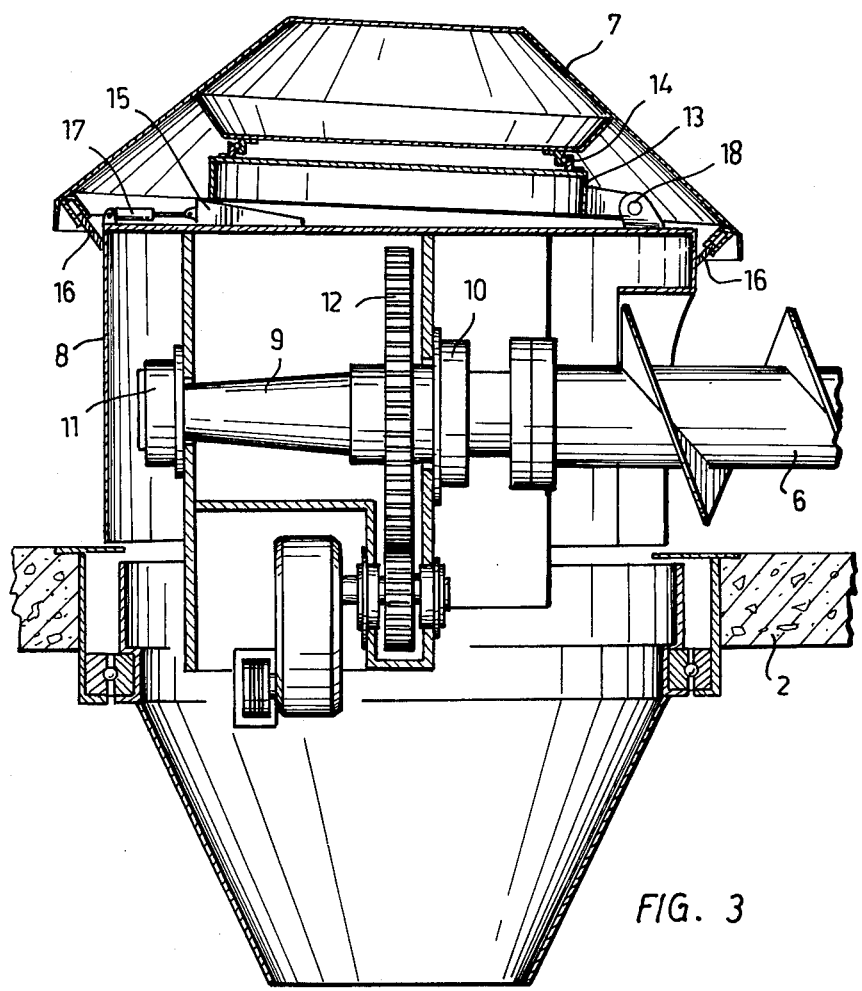
FIG. 3 is a axial vertical section of the unloader of FIG. 1, and, FIG. 4 is an enlarged detail of a portion of the unloader showing another embodiment.
Figure 4:
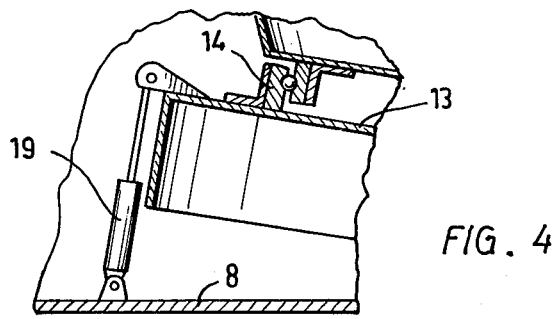

On the bottom 2 of a silo 1 shown in the FIGS. 1 and 2 of the drawing is mounted an unloader 3 according to the invention. The unloaders cause the discharge of material 4 from the silo onto a discharge conveyor 5 mounted underneath the silo. As seen in FIG. 3, the unloader 3 comprises, for its main parts, a horizontal transport screw 6 rotating around its longitudinal axis and a pivot frame 8 supported on the bottom of the silo for rotation around a vertical axis. The transport screw extends radially over the bottom towards the outer periphery of the silo so that the transport screw sweeps over the bottom as the pivot frame swings in the manner indicated by arrow A (FIG. 2) back and forth over 360° while transferring the material in the silo via its rotating screw to an outlet opening located in the centre of the silo bottom and surrounded by the pivot frame 8.

The transport screw is preferably supported only at the inner end facing the centre of the silo. The drive shaft 9 of the transport screw is rotatably journalled in two spaced-apart support bearings 10, 11 supported by the body of the pivot frame 8. The supporting body is mounted on the inner ring of a ball rim bearing while the outer ring of the rim bearing, which is provided with a tooth rim, is fastened in the bottom of the silo by means of a support ring. The upper section of the pivot frame is covered by a protecting hood 7, and the lower section forms the above-mentioned outlet opening. The side of the frame 8 is provided with an opening for the transport screw 6 through which opening the transport screw transfers material from the silo to the outlet opening.

On the drive shaft 9 of the transport screw, between support bearings 10 and 11 there is mounted a gear wheel 12 which via a pinion gear wheel, a reduction gear and a transmission gearing is engaged with a drive motor supported by the pivot frame. The machine rotating the transport screw can be a constant-speed short-circuit motor, a variable speed D.C. motor, an inverter drive, a hydraulic motor, or similar. The gear drive can be replaced by any other known transmission mechanism.

The driving mechanism for the pivot frame can comprise a torsion magnet, a reduction gear and a gear wheel engaged with the tooth rim of the outer ring of the pivot ring. When the gear wheel rotates along the tooth rim of the pivot ring, the pivot ring pivots in relation to the bottom of the silo. The torsion magnet automatically adjusts the pivoting speed of the unloader according to the pivoting resistance prevailing at each particular time and can, when required, be blocked for an indefinite time.

The upper part of the pivot frame 8 is provided with an annular beam 13 on which the protecting hood 7 is mounted via an annular bearing 14 so as to be free of rotation with the beam 13. Between the annular beam 13 and the body of the pivot frame 8 is inserted a wedge 15 operated by e.g. a hydraulic cylinder 17 and by means of which the annular beam and at the same time the bearing 14 are adjustably inclineable relative to the pivot shaft of the pivot frame 8. As the annular beam 13 rotates along with the pivot frame, the protecting hood 7 does not rotate but is continuously inclined back and forth i.e., see-sawed in a circular direction due to which the material above the protecting hood is kept in motion and does not form an arch. In order to prevent the material in the silo from penetrating in between the protecting hood 7 and the pivot frame 8, the protecting hood is provided with a peripheral sealing 16.

The annular beam 13 is preferably connected to the body of the pivot frame 8 by means of a link 18, and instead of the wedges 15, for example, a hydraulic or pneumatic cylinder 19 may be used.

The invention has above been described in connection with an unloader structure and operation of which, except for the protecting hood arrangement, has been described in more detail in the Finnish Patent Application No. 78 1572. Naturally, the invention is also applicable to other existing unloaders provided with a transport screw moving along with the pivot frame.

What we claim is:

1. An unloader for a silo or the like for transferring material stored therein towards an outlet opening on the bottom of the silo, said unloader comprising a pivot frame mounted on the bottom of said silo for rotation around a vertical pivot axis and an upper protecting hood, a horizontal transport screw supported on said pivot frame for rotation around its longitudinal axis, and driving means for rotating said pivot frame and for rotating said transport screw, means for mounting said protecting hood on the upper part of said pivot frame to be rotationally stationary relative to said pivot frame but rotatively tiltable relative to the pivot axis of said pivot frame during rotation of said pivot frame.

2. The unloader according to claim 1, wherein said means for mounting said hood comprises a bearing between said protecting hood and said pivot frame fastened on an annular beam tiltable relative to said pivot frame.

3. The unloader as claimed in claim 2, wherein the means for inclining said annular beam relative to said pivot frame comprises at least one preferably wedge-shaped support piece adjustably mounted between the annular beam and the pivot frame.

4. The unloader according to claim 2, wherein the annular beam is connected to the pivot frame by means of a pressure medium cylinder.

5. The unloader according to any one of the preceding claims, wherein the protecting hood is provided with a peripheral seal abutting the pivot frame, in order to prevent packing of the material between said pivot frame and protecting hood.

* * * * *